Oct. 20, 1936.  T. H. WATKINS  2,058,279
AMUSEMENT DEVICE
Filed March 12, 1935  3 Sheets-Sheet 1

Thomas H. Watkins, INVENTOR
BY Victor J. Evans & Co.
ATTORNEY

Oct. 20, 1936.   T. H. WATKINS   2,058,279
AMUSEMENT DEVICE
Filed March 12, 1935   3 Sheets-Sheet 2
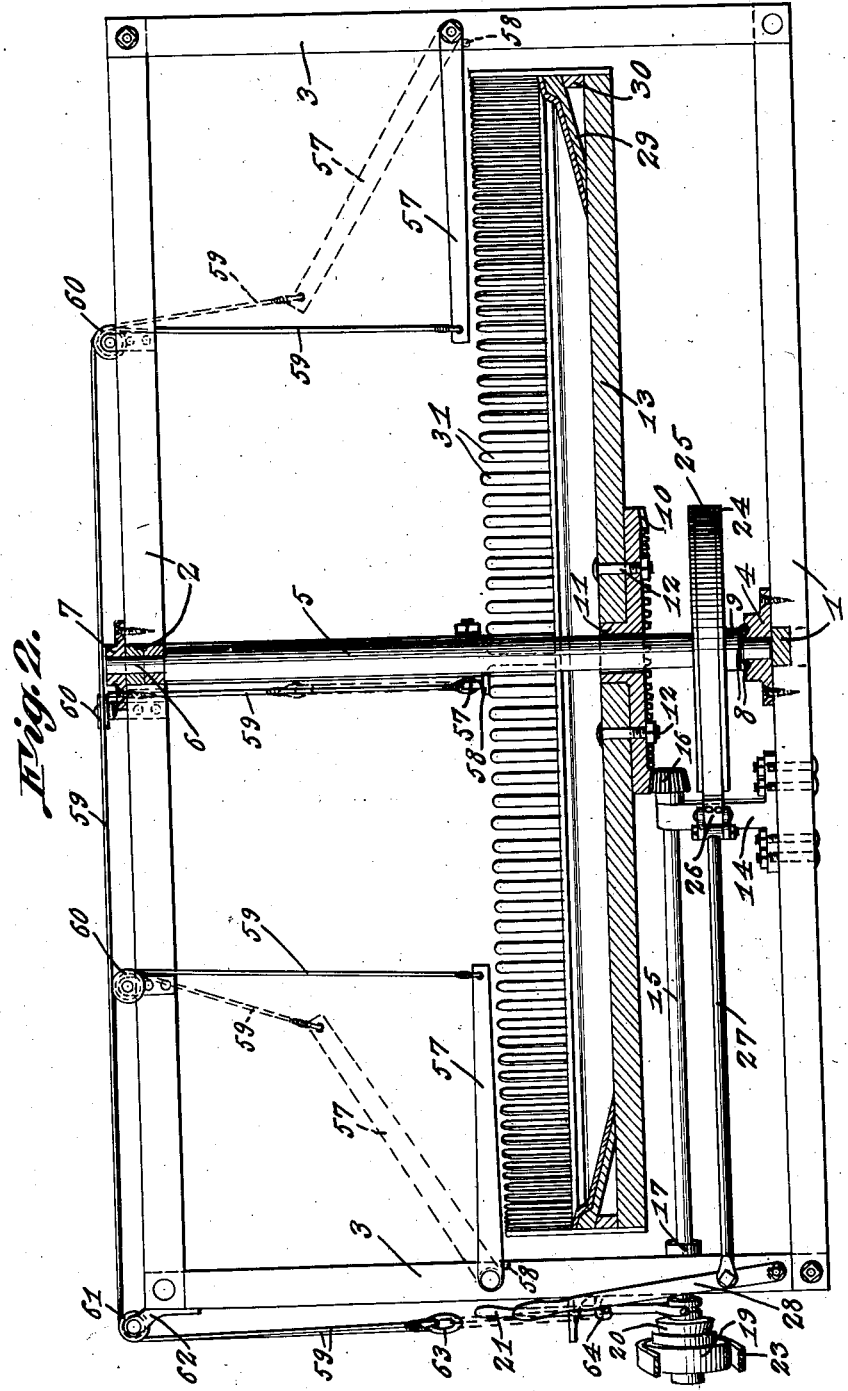

Oct. 20, 1936.  T. H. WATKINS  2,058,279
AMUSEMENT DEVICE
Filed March 12, 1935   3 Sheets-Sheet 3
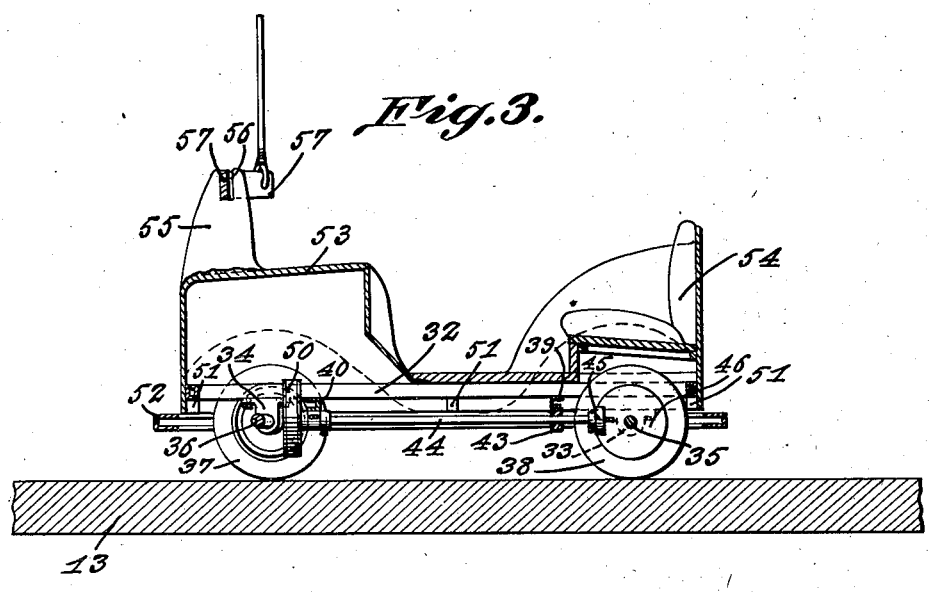
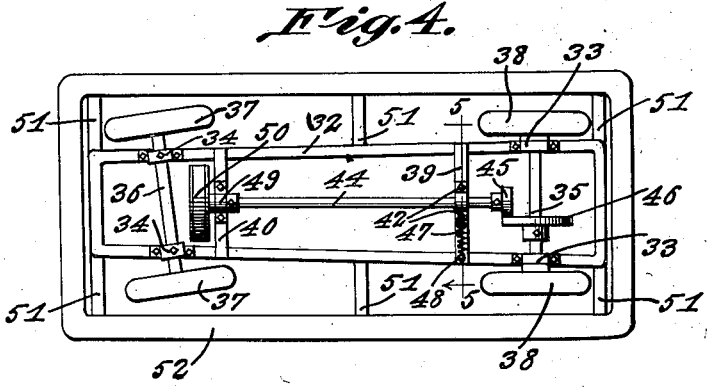
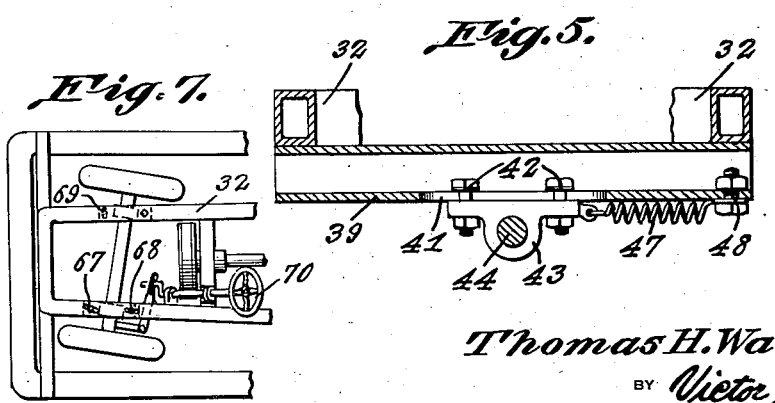
Thomas H. Watkins, INVENTOR
BY Victor J. Evans & Co.
ATTORNEY Patented Oct. 20, 1936

2,058,279

UNITED STATES PATENT OFFICE 2,058,279

AMUSEMENT DEVICE

Thomas H. Watkins, Cassoday, Kans.

Application March 12, 1935, Serial No. 10,736

9 Claims. (Cl. 104—53)

This invention relates to amusement devices, and its general object is to provide a device of that character to simulate a motor vehicle race on a speedway or circular track, the latter being in the form of a turntable, and the device may be made for use by actual riders or in the form of a toy, but in any event the vehicles or racing elements are propelled by a power created by momentum caused by rotation of the track, the contacting engagement of the vehicle wheels therewith, and the use of a fly wheel carried by each vehicle.

A further object of the invention is to provide an amusement device that includes vehicles which have no permanent attachment to the remaining parts of the device, but are initially held for movement with the track to create the propelling power for each vehicle and when released are free to run within the area of the track, with the result the device will cause much amusement and fun, yet is safe due to certain features of the vehicle and the fact that they are confined within the track area.

Another object of the invention is to provide an amusement device that includes a rotating track of circular formation that is under control at all times, which adds to the safety of the device.

A still further object of the invention is to provide an amusement device that is capable of producing maximum pleasure, coupled with thrills, is simple in construction, inexpensive to manufacture and install, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 2 is a view partly in section, taken vertically through the device.

Figure 3 is a longitudinal sectional view taken through one of the vehicles and illustrates the holding means therefor and a portion of the track or turntable.

Figure 4 is a bottom plan view of one of the vehicles.

Figure 5 is a sectional view taken approximately on line 5—5 of Figure 4.

Figure 7 is a fragmentary top plan view of a slightly modified form of vehicle structure.

Figures 1, 6:
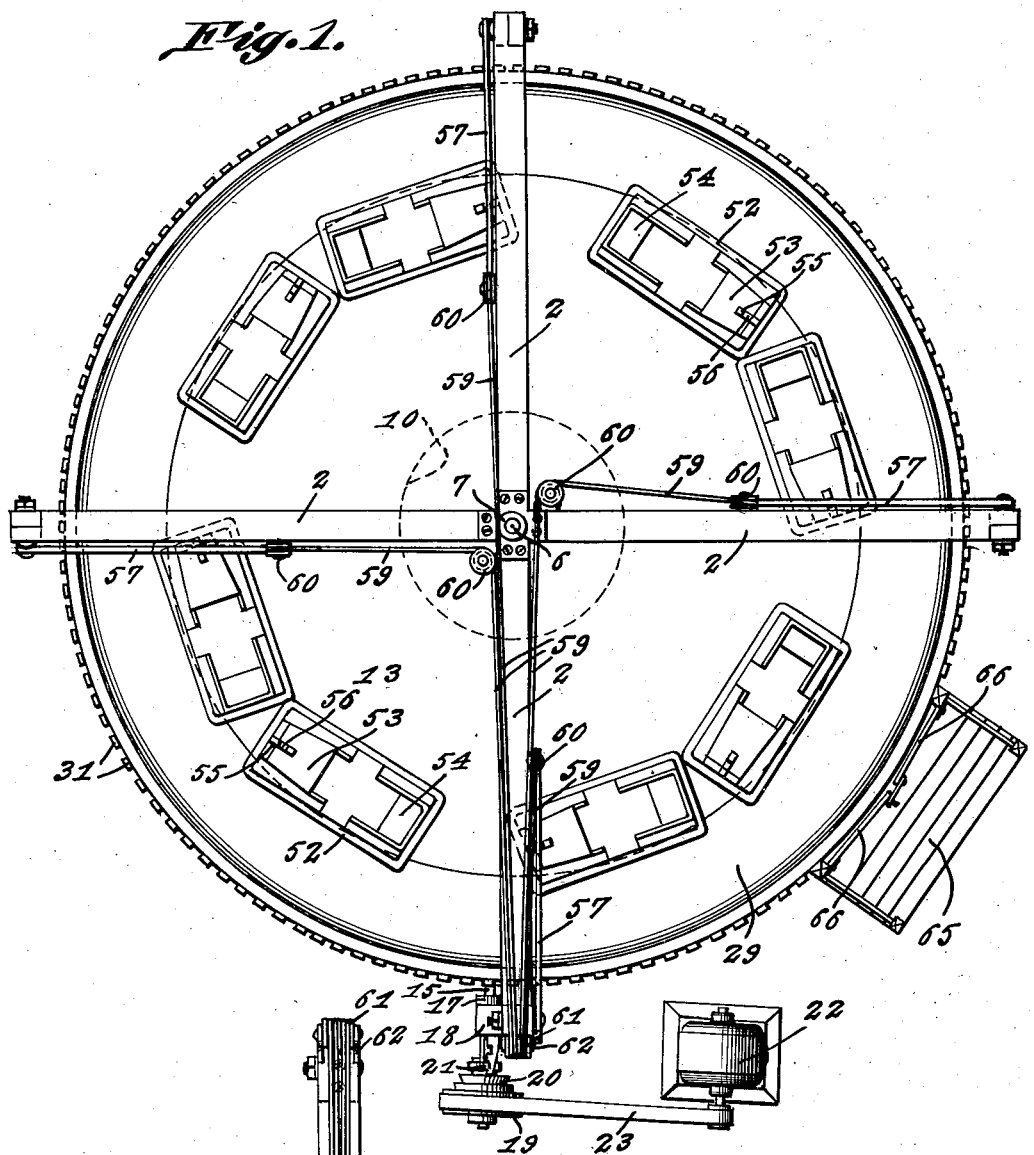
Figure 1 is a top plan view of the amusement device which forms the subject matter of the present invention.
Figure 6 is a view illustrating the controlling means for releasing the vehicle holding means.

Referring to the drawings in detail, it will be noted that I have substantially illustrated my device for use by actual riders, in that motive power including an electric motor has been shown for operating the device, as well as other features to make the device capable for use accordingly, but I want it understood that it can be made in the form of a toy with manual crank operated means and without the use of braking means. However, the latter can be included if desired.

In the form as shown, it will be noted that the device includes a frame having crossed base beams 1 and crossed upper beams 2 that are connected with the beams 1 by uprights 3, the latter being secured to the ends of the beams, as best shown in Figure 2, and the companion beams are preferably secured to each other by countersinking the same midway their ends.

Bridging the point of connection of the base beams and secured thereto is a lower bearing member 4 within which is journaled the lower end of an upright shaft 5, while the upper end of said shaft is reduced to provide a stud 6 that extends through the upper beams 2 and is received in a bearing member 7 that is fixed to the upper beams, as shown. The lower bearing member 4 may have a ball race arranged in the upper face thereof to accommodate bearings 8 to be engaged by a collar 9 formed on or otherwise secured to the shaft, and like anti-friction means may be employed for the upper end of the shaft.

Keyed to the shaft is a bevel gear 10 which has formed therewith a collar 11 surrounding the shaft, and the gear 10 has fixed thereto through the instrumentality of bolt and nut connections 12 a turntable 13 that acts in the capacity of a speedway or track, for a purpose which will be later described.

Secured to one of the base beams is a bearing bracket 14 that includes an upright portion providing a bearing for a horizontal shaft 15 which has secured on one end thereof a pinion 16 disposed in mesh with the teeth of the bevel gear 10. The shaft 15 has its opposite end portion journaled in a bearing 17 of a bracket 18 that is fixed to one of the uprights 3, as shown in Figures 1 and 2, and journaled on the last mentioned end of the shaft 15 is a pulley 19 that is adapted to be connected with the shaft 15 by a clutch 20, the latter being controlled through the instrumentality of a lever 21.

I have shown an electric motor 22 to operate the device and trained about a pulley on the armature shaft of the motor 22, and the pulley 19 is a belt 23. However, any suitable motive power may be employed such as a fuel engine, or suitable manually operated means.

I also provide a braking means for the turntable and which includes a drum 24 secured to the upright shaft 5 adjacent to the lower end thereof and this drum is constructed to receive the brake band 25 that surrounds the same and which is actuated by suitable means 26 having a link 27 connected thereto and with a hand lever 28, the latter being journaled to an upright 3 adjacent to the clutch lever 21, so as to be in convenient reach of the operator of the device.

The circular track or turntable 13 is banked by an inwardly directed downwardly inclined circular platform 29 that extends from the periphery of the turntable and is supported at the periphery by blocks or the like 30. The banking platform is preferably provided with a suitable covering as shown, and an annular raised portion at its outer periphery, and is of course for the purpose of directing the vehicles which will be presently described away from the edge of the turntable, but the latter is likewise provided with what may be termed a safety fence which in the form as shown is made up of a plurality of pickets 31 secured to the periphery of the turntable and rising a considerable distance above the platform. The annular raised portion of the platform prevents the vehicles from contacting the fence. The pickets are preferably formed from relatively thick strips of steel, so as to be substantially flexible to give slightly in the event a vehicle should contact the same, in order to absorb the shock.

The vehicles of my device are of a particular construction, but each include a frame 32 having secured to and depending therefrom bearing members 33 and 34 arranged in pairs, and the bearing members 33 have journaled therein the rear axle 35, while the bearing members 34 have fixed therein the front axle 36 which is normally disposed at an inclination with respect to the frame, by the arrangement of the bearings 34 to cause the vehicle to move in a circle as will be apparent upon inspection of Figure 4. Each of the axles carry wheels, the front wheels 37 being journaled on the axle 36 while the rear wheels 38 are fixed to the axle 35 for rotation therewith.

Bridging the side rails of the frame 32 are cross pieces 39 and 40 which are in the form of U-members, and the cross piece 39 has a slot 41 arranged in the lower portion thereof to slidably receive bolt and nut connections 42 of a bearing bracket 43, the latter having journaled therein a drive shaft 44, that has secured on the rear end thereof, a friction wheel 45 which is held in contact with a friction drum 46 fixed to the rear axle 35, through the medium of a spring 47. The spring has one end secured to the bearing bracket 43 and its opposite end secured to a bolt of a bolt and nut connection 48 which is fixed to the cross piece 39.

The drive shaft 44 is journaled in a bearing bracket 49 that is secured to the cross piece 40, and the front end of the shaft 44 has fixed thereto a fly wheel 50.

Extending outwardly and laterally from the frame 32 are bracket members 51 that have secured to the outer ends thereof a bumper frame 52 of rectangular formation for disposal about the entire vehicle, as clearly shown in Figure 4, so as to add to the safety of the device as well as to prevent the vehicle from becoming damaged, as will be apparent.

Each of the vehicles is provided with a body including a forward portion 53 in the form of a hood, and disposed in the rear of the body portion is a seat 54 that may be of a size to accommodate two persons, if the device is constructed for that purpose, and the seats are provided with suitable cushions as shown.

Secured to and rising from the forward portion 53 of each of the vehicles, is an upright member 55 having a notch 56 arranged in the upper end thereof for the purpose of receiving a lever 57. In the form as shown, there are four of these levers, one for each upright 3, and these levers 57 are pivotally secured to the uprights 3 for movement to the full and dotted line positions, as shown in Figure 2. A pin 58 is provided for each of the levers 57 and these pins extend laterally from the uprights 3 for holding the levers in their operative or full line position of Figure 2.

In order to raise the levers to their inoperative or dotted line position of Figure 2, I provide a cable 59 for each lever, and the cables 59 are trained about pulleys 60 for directing all of the cables in a common direction to be trained about a plural grooved pulley 61, there being a groove in the pulley 61 for each of the cables. The pulleys 60 are journaled to the upper beams 2 at appropriate places as shown in Figure 1, while the pulley 61 is journaled in a bracket 62 that is fixed to an upright 3. The free ends of the cables 59 are each secured to a ring 63, and these ends are so arranged that the ring 63 is disposed adjacent to the levers 21 and 28, so that the ring will be in convenient reach of the operator of the device as will be apparent. Secured to an upright 3 is a hook 64 for the purpose of receiving the ring, to hold the levers in the dotted line position of Figure 2.

In the form as shown, a set of steps 65 is provided, and these steps may be secured to means having connection with the base beams, but in any event are for the purpose to facilitate persons reaching or leaving the turntable, and gates 66, with suitable latching means therefor may be employed with the steps.

In the operation of my device, in the form as shown, the levers 57 are first positioned in the notches 56 of the uprights 55 of four of the vehicles, to hold these vehicles against movement and the other vehicles contact the held vehicles to prevent movement thereof. The motor 22 is then started to cause the turntable to rotate which will result in the wheels of the vehicles rotating therewith. Due to the fact that the wheels of the vehicles contact the turntable, it will be apparent that the fly wheels 50 of the vehicles are put into motion, to store up energy to provide propelling power. When a predetermined speed of the fly wheels is reached, the vehicles are released by the operator pulling upon the ring 63, and the operator can then apply the brake to stop the movement of the turntable, but as the fly wheels 50 of the vehicles are in motion, it will be obvious that the vehicles will travel about the turntable due to the propelling power brought about by the fly wheels thereof.

In Figure 7 I have illustrated a modified form of vehicle structure, in which the front axle bearings are movable to allow for limited steering of the vehicle, and one side member of the frame 32 is provided with a pair of inclined slots to receive means for connecting one axle bearing to the frame, the front slot 67 being inclined to a greater degree than the rear one 68, while the other side member is provided with a transversely disposed slot 69 and an opening to the rear thereof, to receive means to connect the other axle bearing to the frame. The axle is fixed in the bearings and has connected thereto, steering mechanism including a wheel 70, for moving the bearings on the frame. By this construction, it will be apparent that a vehicle so equipped can be made to describe a smaller circle than a vehicle having fixed bearings but it cannot be straightened out or caused to make a wider circle. This allows a vehicle to cut in ahead of another, by making a smaller circle and then it may be pulled back to its original position.

When the device is made in the form of a toy the front wheels on alternating vehicles may be set at different angles thus allowing them to pass each other.

It will of course be understood that the vehicles may be provided with any type of body.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An amusement device comprising a track, means for moving said track, braking means to stop the movement, wheeled vehicles mounted for movement on said track, releasable means for holding the vehicles against movement, a fly wheel for each vehicle, friction means having connection with the rear wheels of the vehicles to put the fly wheels into motion by the movement of the track to store up energy for the vehicles when held, to cause movement of the vehicles when released and the track is stopped.

2. An amusement device comprising a track mounted for rotation, means for rotating said track, vehicles mounted for movement on said track, notched means carried by the vehicles, a frame for said track, levers pivotally mounted on said frame to be received in the notched means of some of said vehicles to hold the latter against movement, means for simultaneously removing said levers from the notched means to release the vehicles, braking means for said track, and means to store up energy for said vehicles by the movement of said track when the vehicles are held to cause movement of the vehicles about said track when the latter is stopped by the braking means.

3. An amusement device comprising a movable track, means for moving said track, means to brake said track to stop its movement, vehicles mounted for movement on said track, releasable means for holding the vehicles against movement, and means carried by said vehicles and acted upon by the movement of the track when the vehicles are held to store up kinetic energy therein, to cause movement of the vehicles when released and the track is braked.

4. An amusement device comprising a rotary track, means for rotating said track, braking means for said track to stop its rotation, vehicles mounted for movement on said track, releasable means for holding said vehicles against movement and means carried by said vehicles and acted upon by the movement of the track when the vehicles are held to store up kinetic energy therein, to cause movement of the vehicles when released and the track is braked.

5. An amusement device comprising a rotary track, means for rotating said track, braking means for said track to stop its rotation, vehicles mounted for movement on said track to travel thereon, releasable means for holding the vehicles against movement, means carried by said vehicles and acted upon by the movement of the track when the vehicles are held to store up kinetic energy therein to cause movement of the vehicles when released and the track is braked, means about the outer edge of the track to confine the travel of the vehicles within the area of the track, and bumper means about each vehicle.

6. An amusement device comprising a rotary track, means for rotating said track, braking means for said track for stopping its rotation, vehicles mounted for movement on said track, a stationary frame for said track, means carried by the vehicles and mounted on the frame respectively to hold the vehicles against movement, releasable means included in the last mentioned means, and means carried by said vehicles and acted upon by the movement of the track when the vehicles are held to store up kinetic energy therein to cause movement of the vehicles, when released and the track is braked.

7. An amusement device comprising a frame including superimposed members, a shaft vertically mounted for rotation in the superimposed members, a turntable secured to the shaft, means for rotating the turntable through the shaft, braking means for stopping the rotation, vehicles mounted for independent travel on the turntable, releasable means carried by the vehicles and mounted on the frame to hold the vehicles against movement, and means for and carried by each vehicle and acted upon by the movement of the turntable when the vehicles are held to store up kinetic energy in said vehicles to cause movement of the latter when released and the turntable is braked.

8. An amusement device comprising a frame, a turntable mounted for rotation within said frame, means for rotating said turntable, vehicles mounted for movement on the turntable, vehicle banking means on the turntable, resilient means cooperating with the banking means to retain the vehicles within the area of the turntable, releasable means for holding the vehicles against movement, and means carried by said vehicles and acted upon by the movement of the turntable when the vehicles are held to store up kinetic energy therein for causing movement of the vehicles when released and the track is braked.

9. An amusement device comprising a movable track, means for moving said track, means to brake said track to stop its movement, wheeled vehicles mounted for independent movement on said track, releasable means for holding the vehicles against movement, a fly wheel for each vehicle, and connected to certain wheels thereof to be acted upon by the movement of the track when the vehicles are held to store up kinetic energy in the fly wheels for causing movement of the vehicles when released and the track is braked.

THOMAS H. WATKINS.